US012664992B2

(12) United States Patent
Vasilache

(10) Patent No.: US 12,664,992 B2
(45) Date of Patent: Jun. 23, 2026

(54) SPATIAL AUDIO PARAMETER ENCODING AND ASSOCIATED DECODING

(71) Applicant: Nokia Technologies Oy, Espoo (FI)

(72) Inventor: Adriana Vasilache, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 478 days.

(21) Appl. No.: 18/245,028

(22) PCT Filed: Aug. 18, 2021

(86) PCT No.: PCT/FI2021/050556
§ 371 (c)(1),
(2) Date: Mar. 13, 2023

(87) PCT Pub. No.: WO2022/058645
PCT Pub. Date: Mar. 24, 2022

(65) Prior Publication Data

US 2023/0410823 A1 Dec. 21, 2023

(30) Foreign Application Priority Data

Sep. 16, 2020 (GB) ..................................... 2014572

(51) Int. Cl.
*G10L 19/032* (2013.01)
*G10L 19/008* (2013.01)

(52) U.S. Cl.
CPC .......... *G10L 19/032* (2013.01); *G10L 19/008* (2013.01)

(58) Field of Classification Search
None
See application file for complete search history.

(56) References Cited

U.S. PATENT DOCUMENTS

2007/0094027 A1 4/2007 Vasilache
2015/0332682 A1* 11/2015 Kim ...................... G10L 19/008 381/23

(Continued)

FOREIGN PATENT DOCUMENTS

CN 102610234 A 7/2012
CN 111276153 A 6/2020

(Continued)

OTHER PUBLICATIONS

C. Yang, R. Hu, X. Wang, Y. Yang, M. Zhang and W. Chen, "3D audio coding approach based on spatial perception features," in China Communications, vol. 14, No. 11, pp. 126-140, Nov. 2017, doi: 10.1109/CC.2017.8233656 (Year: 2017).*

(Continued)

*Primary Examiner* — Richemond Dorvil
*Assistant Examiner* — Alexander G Marlow
(74) *Attorney, Agent, or Firm* — ALSTON & BIRD LLP

(57) ABSTRACT

An apparatus comprising means configured to: obtain a multichannel audio signal; obtain direction parameter values associated with at least two time-frequency parts of the multichannel audio signal, the direction parameter values associated with at least two time-frequency parts comprising an elevation element and an azimuth element associated with at least two time-frequency parts; and compand encode the obtained direction parameter values, the means configured to compand encode the obtained direction parameter values is further configured to: quantize the elevation element; determine a companding function based on the quantized elevation element and/or multichannel audio signal format; generate a companded azimuth element based on the companding function applied to the azimuth element; and quantize the companded azimuth element.

20 Claims, 10 Drawing Sheets

(56) References Cited

U.S. PATENT DOCUMENTS

| | | | | |
|---|---|---|---|---|
| 2016/0142850 | A1* | 5/2016 | Borss | H04S 5/005 381/23 |
| 2017/0011751 | A1 | 1/2017 | Fueg et al. | |
| 2019/0066701 | A1 | 2/2019 | Fatus et al. | |
| 2020/0058311 | A1* | 2/2020 | Goodwin | G10L 19/008 |
| 2020/0265851 | A1 | 8/2020 | Fuchs et al. | |
| 2020/0273467 | A1 | 8/2020 | Laaksonen et al. | |
| 2020/0273473 | A1* | 8/2020 | Fuchs | G10L 19/008 |

FOREIGN PATENT DOCUMENTS

| | | | | |
|---|---|---|---|---|
| CN | 111316353 | A | 6/2020 | |
| GB | 2575305 | A | 1/2020 | |
| GB | 2592896 | A | 9/2021 | |
| WO | 2006/111294 | A1 | 10/2006 | |
| WO | 2015/036349 | A1 | 3/2015 | |
| WO | WO-2015028715 | A1 * | 3/2015 | G10L 19/008 |
| WO | 2020/070377 | A1 | 4/2020 | |
| WO | 2021/136879 | A1 | 7/2021 | |

OTHER PUBLICATIONS

B. Matschkal and J. B. Huber, "Spherical Logarithmic Quantization," in IEEE Transactions on Audio, Speech, and Language Processing, vol. 18, No. 1, pp. 126-140, Jan. 2010, doi: 10.1109/TASL.2009.2024383 (Year: 2010).*

Search Report received for corresponding United Kingdom Patent Application No. 2014572.8, dated Mar. 5, 2021, 4 pages.

International Search Report and Written Opinion received for corresponding Patent Cooperation Treaty Application No. PCT/FI2021/050556, dated Dec. 16, 2021, 19 pages.

Li et al., "The Perceptual Lossless Quantization of Spatial Parameter for 3D Audio Signals", International Conference on Multimedia Modeling, 2017, pp. 381-392.

Gao et al., "JND-based spatial parameter quantization of multichannel audio signals", EURASIP Journal on Audio, Speech, and Music Processing, Article No. 13, 2016, pp. 1-18.

Pauly, "Lecture 12: Digital Communication", Stanford, Lecture Notes, Oct. 31, 2021, 22 pages.

Office action received for corresponding Canadian Patent Application No. 3192976, dated Sep. 10, 2024, 4 pages.

Office action received for corresponding European Patent Application No. 21868790.3, dated Aug. 11, 2025, 4 pages.

Extended European Search Report received for corresponding European Patent Application No. 21868790.3, dated Jul. 15, 2024, 5 pages.

Office action received for corresponding Indian Patent Application No. 202317026821, dated Dec. 13, 2024, 5 pages.

Office Action for Chinese Application No. 202180076939.4 dated Nov. 21, 2025, 8 pages.

Intention to Grant for European Application No. 21868790.3 dated May 15, 2025, 7 pages.

International Search Report and Written Opinion for Patent Cooperation Treaty Application No. PCT/FI2021/050556 dated Dec. 16, 2021, 19 pages.

IPEA/409—International Preliminary Report on Patentability Mailed on Mar. 30, 2023 for WO Application No. PCT/FI21/050556, 14 page(s).

Notice of Allowance for Chinese Application No. 202180076939.4 dated Apr. 13, 2026, 4 pages.

* cited by examiner

SPATIAL AUDIO PARAMETER ENCODING AND ASSOCIATED DECODING

FIELD

The present application relates to apparatus and methods for sound-field related parameter encoding, but not exclusively for time-frequency domain direction related parameter encoding for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of directional metadata parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directional metadata such as directions and direct-to-total energy ratios in frequency bands are thus a parameterization that is particularly effective for spatial audio capture.

A directional metadata parameter set consisting of one or more direction value for each frequency band and an energy ratio parameter associated with each direction value can be also utilized as spatial metadata (which may also include other parameters such as spread coherence, number of directions, distance, etc.) for an audio codec. The directional metadata parameter set may also comprise other parameters or may be associated with other parameters which are considered to be non-directional (such as surround coherence, diffuse-to-total energy ratio, remainder-to-total energy ratio). For example, these parameters can be estimated from microphone-array captured audio signals, and for example a stereo signal can be generated from the microphone array signals to be conveyed with the spatial metadata.

As some codecs are expected to operate at various bit rates ranging from very low bit rates to relatively high bit rates, various strategies are needed for the compression of the spatial metadata to optimize the codec performance for each operating point. The raw bitrate of the encoded parameters (metadata) is relatively high, so especially at lower bitrates it is expected that only the most important parts of the metadata can be conveyed from the encoder to the decoder.

A decoder can decode the audio signals into PCM signals and process the sound in frequency bands (using the spatial metadata) to obtain the spatial output, for example a binaural output.

The aforementioned solution is particularly suitable for encoding captured spatial sound from microphone arrays (e.g., in mobile phones, video cameras, VR cameras, standalone microphone arrays). However, it may be desirable for such an encoder to have also other input types than microphone-array captured signals, for example, loudspeaker signals, audio object signals, or Ambisonics signals.

SUMMARY

There is provided according to a first aspect an apparatus comprising means configured to: obtain a multichannel audio signal; obtain direction parameter values associated with at least two time-frequency parts of the multichannel audio signal, the direction parameter values associated with at least two time-frequency parts comprising an elevation element and an azimuth element associated with at least two time-frequency parts; and compand encode the obtained direction parameter values, the means configured to compand encode the obtained direction parameter values is further configured to: quantize the elevation element; determine a companding function based on the quantized elevation element and/or multichannel audio signal format; generate a companded azimuth element based on the companding function applied to the azimuth element; and quantize the companded azimuth element.

The means may be further configured to decompand the quantized companded azimuth element based on an inverse of the companding function.

The means configured to determine a companding function based on the quantized elevation element and/or the multichannel audio signal format may be further configured to determine a companding function based on the quantized elevation element and the multichannel audio signal format.

The means configured to compand encode the obtained direction parameter values may be further configured to generate a codeword for each quantized elevation element and quantized companded azimuth element.

The means configured to compand encode the obtained direction parameter values may be further configured to generate a codeword for each quantized elevation element and decompanded quantized companded azimuth element.

The means may be further configured to determine a quantization error for the compand encode and an average elevation encode, wherein the means configured to average elevation encode may be configured to: quantize an average elevation element for a sub-band within a frame; and quantize the azimuth element based on a quantization grid with variable borders, and wherein the means is configured to select a compand encode output or an average elevation encode output based on the quantization error.

The means may be further configured to determine a quantization grid based on an allocated number of bits for encoding each sub-band within a frame comprising sub-bands and time blocks based on a value of an energy ratio value associated with the obtained direction parameter values, wherein the means configured to quantize the elevation element is configured to quantize the elevation element based on the quantization grid, and the means configured to quantize the companded azimuth element is configured to quantize the companded azimuth based on the quantization grid.

According to a second aspect there is provided an apparatus comprising means configured to: obtain at least one encoded bitstream comprising: an encoded multichannel audio signal and compand encoded direction parameter values, the compand encoded direction parameter values associated with at least two time-frequency parts of the encoded multichannel audio signal, and the encoded direction parameter values associated with at least two time-frequency parts comprising an encoded elevation element and a companded encoded azimuth element associated with at least two time-frequency parts; decode the encoded elevation element; determine a decompanding function based on the encoded elevation element and/or multichannel audio signal format; generate a decompanded azimuth element based on the decompanding function applied to the companded encoded azimuth element.

The means configured to determine a decompanding function based on the encoded elevation element and/or the multichannel audio signal format may be further configured to determine a decompanding function based on the encoded elevation element and the multichannel audio signal format.

The means configured to decode the encoded elevation element may be further configured to decode a codeword for each quantized elevation element.

The means may be further configured to determine a quantization grid based on an allocated number of bits for encoding each sub-band within a frame comprising sub-bands and time blocks based on a value of an energy ratio value associated with the obtained direction parameter values, wherein the means configured to decode a codeword for each quantized elevation element may be configured to decode the elevation element based on the quantization grid.

According to a third aspect there is provided a method comprising: obtaining a multichannel audio signal; obtaining direction parameter values associated with at least two time-frequency parts of the multichannel audio signal, the direction parameter values associated with at least two time-frequency parts comprising an elevation element and an azimuth element associated with at least two time-frequency parts; and compand encoding the obtained direction parameter values, wherein compand encoding the obtained direction parameter values comprises: quantizing the elevation element; determining a companding function based on the quantized elevation element and/or multichannel audio signal format; generating a companded azimuth element based on the companding function applied to the azimuth element; and quantizing the companded azimuth element.

The method may further comprise decompanding the quantized companded azimuth element based on an inverse of the companding function.

Determining a companding function based on the quantized elevation element and/or multichannel audio signal format may further comprise determining a companding function based on the quantized elevation element and multichannel audio signal format.

Compand encoding the obtained direction parameter values may further comprise generating a codeword for each quantized elevation element and quantized companded azimuth element.

Compand encoding the obtained direction parameter values may further comprise generating a codeword for each quantized elevation element and decompanded quantized companded azimuth element.

The method may further comprise determining a quantization error for the compand encoding and an average elevation encoding, wherein average elevation encoding may comprise: quantizing an average elevation element for a sub-band within a frame; and quantizing the azimuth element based on a quantization grid with variable borders, and the method may further comprise selecting a compand encoding output or an average elevation encoding output based on the quantization error.

The method may further comprise determining a quantization grid based on an allocated number of bits for encoding each sub-band within a frame comprising sub-bands and time blocks based on a value of an energy ratio value associated with the obtained direction parameter values, wherein quantizing the elevation element may comprise quantizing the elevation element based on the quantization grid, and quantizing the companded azimuth element may comprise quantizing the companded azimuth based on the quantization grid.

According to a fourth aspect there is provided a method comprising: obtaining at least one encoded bitstream comprising: an encoded multichannel audio signal and compand encoded direction parameter values, the compand encoded direction parameter values associated with at least two time-frequency parts of the encoded multichannel audio signal, and the encoded direction parameter values associated with at least two time-frequency parts comprising an encoded elevation element and a companded encoded azimuth element associated with at least two time-frequency parts; decoding the encoded elevation element; determining a decompanding function based on the encoded elevation element and/or multichannel audio signal format; and generating a decompanded azimuth element based on the decompanding function applied to the companded encoded azimuth element.

Determining a decompanding function based on the encoded elevation element and/or multichannel audio signal format may further comprise determining a decompanding function based on the encoded elevation element and the multichannel audio signal format.

Decoding the encoded elevation element may further comprise decoding a codeword for each quantized elevation element.

The method may further comprise determining a quantization grid based on an allocated number of bits for encoding each sub-band within a frame comprising sub-bands and time blocks based on a value of an energy ratio value associated with the obtained direction parameter values, wherein the means configured to decode a codeword for each quantized elevation element is configured to decode the elevation element based on the quantization grid.

According to a fifth aspect there is provided an apparatus comprising at least one processor and at least one memory including a computer program code, the at least one memory and the computer program code configured to, with the at least one processor, cause the apparatus at least to: obtain a multichannel audio signal; obtain direction parameter values associated with at least two time-frequency parts of the multichannel audio signal, the direction parameter values associated with at least two time-frequency parts comprising an elevation element and an azimuth element associated with at least two time-frequency parts; and compand encode the obtained direction parameter values, the apparatus caused to compand encode the obtained direction parameter values is further caused to: quantize the elevation element; determine a companding function based on the quantized elevation element and/or multichannel audio signal format; generate a companded azimuth element based on the companding function applied to the azimuth element; and quantize the companded azimuth element.

The apparatus may be further caused to decompand the quantized companded azimuth element based on an inverse of the companding function.

The apparatus caused to determine a companding function based on the quantized elevation element and/or multichannel audio signal format may be further caused to determine a companding function based on the quantized elevation element and the multichannel audio signal format.

The apparatus caused to compand encode the obtained direction parameter values may be further caused to generate a codeword for each quantized elevation element and quantized companded azimuth element.

The apparatus caused to compand encode the obtained direction parameter values may be further caused to generate a codeword for each quantized elevation element and decompanded quantized companded azimuth element.

The apparatus may be further caused to determine a quantization error for the compand encode and an average elevation encode, wherein the apparatus caused to determine an average elevation encode may be further caused to: quantize an average elevation element for a sub-band within a frame; and quantize the azimuth element based on a quantization grid with variable borders, and wherein the apparatus may be further caused to select a compand encode output or an average elevation encode output based on the quantization error.

The apparatus may be further caused to determine a quantization grid based on an allocated number of bits for encoding each sub-band within a frame comprising sub-bands and time blocks based on a value of an energy ratio value associated with the obtained direction parameter values, wherein the apparatus caused to quantize the elevation element may be caused to quantize the elevation element based on the quantization grid, and the apparatus caused to quantize the companded azimuth element may be caused to quantize the companded azimuth based on the quantization grid.

According to a sixth aspect there is provided an apparatus comprising at least one processor and at least one memory including a computer program code, the at least one memory and the computer program code configured to, with the at least one processor, cause the apparatus at least to: obtain at least one encoded bitstream comprising: an encoded multichannel audio signal and compand encoded direction parameter values, the compand encoded direction parameter values associated with at least two time-frequency parts of the encoded multichannel audio signal, and the encoded direction parameter values associated with at least two time-frequency parts comprising an encoded elevation element and a companded encoded azimuth element associated with at least two time-frequency parts; decode the encoded elevation element; determine a decompanding function based on the encoded elevation element and/or multichannel audio signal format; generate a decompanded azimuth element based on the decompanding function applied to the companded encoded azimuth element.

The apparatus caused to determine a decompanding function based on the the encoded elevation element and/or the multichannel audio signal format may be further caused to determine a decompanding function based on the encoded elevation element and multichannel audio signal format.

The apparatus caused to decode the encoded elevation element may be further caused to decode a codeword for each quantized elevation element.

The apparatus may be further caused to determine a quantization grid based on an allocated number of bits for encoding each sub-band within a frame comprising sub-bands and time blocks based on a value of an energy ratio value associated with the obtained direction parameter values, wherein the apparatus caused to decode a codeword for each quantized elevation element may be caused to decode the elevation element based on the quantization grid.

According to a seventh aspect there is provided an apparatus comprising: means for obtaining a multichannel audio signal; means for obtaining direction parameter values associated with at least two time-frequency parts of the multichannel audio signal, the direction parameter values associated with at least two time-frequency parts comprising an elevation element and an azimuth element associated with at least two time-frequency parts; and means for compand encoding the obtained direction parameter values, the means for compand encoding the obtained direction parameter values comprising: means for quantizing the elevation element; means for determining a companding function based on the quantized elevation element and/or multichannel audio signal format; means for generating a companded azimuth element based on the companding function applied to the azimuth element; and means for quantizing the companded azimuth element.

According to an eighth aspect there is provided an apparatus comprising: means for obtaining at least one encoded bitstream comprising: an encoded multichannel audio signal and compand encoded direction parameter values, the compand encoded direction parameter values associated with at least two time-frequency parts of the encoded multichannel audio signal, and the encoded direction parameter values associated with at least two time-frequency parts comprising an encoded elevation element and a companded encoded azimuth element associated with at least two time-frequency parts; means for decoding the encoded elevation element; determining a decompanding function based on the encoded elevation element and/or multichannel audio signal format; and means for generating a decompanded azimuth element based on the decompanding function applied to the companded encoded azimuth element.

According to a ninth aspect there is provided a computer program comprising instructions [or a computer readable medium comprising program instructions] for causing an apparatus to perform at least the following: obtaining a multichannel audio signal; obtaining direction parameter values associated with at least two time-frequency parts of the multichannel audio signal, the direction parameter values associated with at least two time-frequency parts comprising an elevation element and an azimuth element associated with at least two time-frequency parts; and compand encoding the obtained direction parameter values, wherein compand encoding the obtained direction parameter values comprises: quantizing the elevation element; determining a companding function based on the quantized elevation element and/or multichannel audio signal format; generating a companded azimuth element based on the companding function applied to the azimuth element; and quantizing the companded azimuth element.

According to a tenth aspect there is provided a computer program comprising instructions [or a computer readable medium comprising program instructions] for causing an apparatus to perform at least the following: obtaining at least one encoded bitstream comprising: an encoded multichannel audio signal and compand encoded direction parameter values, the compand encoded direction parameter values associated with at least two time-frequency parts of the encoded multichannel audio signal, and the encoded direction parameter values associated with at least two time-frequency parts comprising an encoded elevation element and a companded encoded azimuth element associated with at least two time-frequency parts; decoding the encoded elevation element; determining a decompanding function based on the encoded elevation element and/or multichannel audio signal format; and generating a decompanded azimuth element based on the decompanding function applied to the companded encoded azimuth element.

According to an eleventh aspect there is provided a non-transitory computer readable medium comprising program instructions for causing an apparatus to perform at least the following: obtaining a multichannel audio signal; obtaining direction parameter values associated with at least two time-frequency parts of the multichannel audio signal, the direction parameter values associated with at least two time-frequency parts comprising an elevation element and an azimuth element associated with at least two time-frequency parts; and compand encoding the obtained direction parameter values, wherein compand encoding the obtained direction parameter values comprises: quantizing the elevation element; determining a companding function based on the quantized elevation element and/or multichannel audio signal format; generating a companded azimuth element based on the companding function applied to the azimuth element; and quantizing the companded azimuth element.

According to a twelfth aspect there is provided a non-transitory computer readable medium comprising program instructions for causing an apparatus to perform at least the following: obtaining at least one encoded bitstream comprising: an encoded multichannel audio signal and compand encoded direction parameter values, the compand encoded direction parameter values associated with at least two time-frequency parts of the encoded multichannel audio signal, and the encoded direction parameter values associated with at least two time-frequency parts comprising an encoded elevation element and a companded encoded azimuth element associated with at least two time-frequency parts; decoding the encoded elevation element; determining a decompanding function based on the encoded elevation element and/or multichannel audio signal format; and generating a decompanded azimuth element based on the decompanding function applied to the companded encoded azimuth element.

According to a thirteenth aspect there is provided an apparatus comprising: obtaining circuitry configured to obtain a multichannel audio signal; obtaining circuitry configured to obtain direction parameter values associated with at least two time-frequency parts of the multichannel audio signal, the direction parameter values associated with at least two time-frequency parts comprising an elevation element and an azimuth element associated with at least two time-frequency parts; and encoding circuitry configured to compand encode the obtained direction parameter values, wherein the encoding circuitry configured to compand encode the obtained direction parameter values is configured to: quantize the elevation element; determine a companding function based on the quantized elevation element and/or multichannel audio signal format; generate a companded azimuth element based on the companding function applied to the azimuth element; and quantize the companded azimuth element.

According to a fourteenth aspect there is provided an apparatus comprising: obtaining circuitry configured to obtain at least one encoded bitstream comprising: an encoded multichannel audio signal and compand encoded direction parameter values, the compand encoded direction parameter values associated with at least two time-frequency parts of the encoded multichannel audio signal, and the encoded direction parameter values associated with at least two time-frequency parts comprising an encoded elevation element and a companded encoded azimuth element associated with at least two time-frequency parts; decoding circuitry configured to decode the encoded elevation element; determine a decompanding function based on the encoded elevation element and/or multichannel audio signal format; generating circuitry configured to generate a decompanded azimuth element based on the decompanding function applied to the companded encoded azimuth element.

According to a fifteenth aspect there is provided a computer readable medium comprising program instructions for causing an apparatus to perform at least the following: obtaining a multichannel audio signal; obtaining direction parameter values associated with at least two time-frequency parts of the multichannel audio signal, the direction parameter values associated with at least two time-frequency parts comprising an elevation element and an azimuth element associated with at least two time-frequency parts; and compand encoding the obtained direction parameter values, wherein compand encoding the obtained direction parameter values comprises: quantizing the elevation element; determining a companding function based on the quantized elevation element and/or multichannel audio signal format; generating a companded azimuth element based on the companding function applied to the azimuth element; and quantizing the companded azimuth element.

According to a sixteenth aspect there is provided a computer readable medium comprising program instructions for causing an apparatus to perform at least the following: obtaining at least one encoded bitstream comprising: an encoded multichannel audio signal and compand encoded direction parameter values, the compand encoded direction parameter values associated with at least two time-frequency parts of the encoded multichannel audio signal, and the encoded direction parameter values associated with at least two time-frequency parts comprising an encoded elevation element and a companded encoded azimuth element associated with at least two time-frequency parts; decoding the encoded elevation element; determining a decompanding function based on the encoded elevation element and/or multichannel audio signal format; and generating a decompanded azimuth element based on the decompanding function applied to the companded encoded azimuth element.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
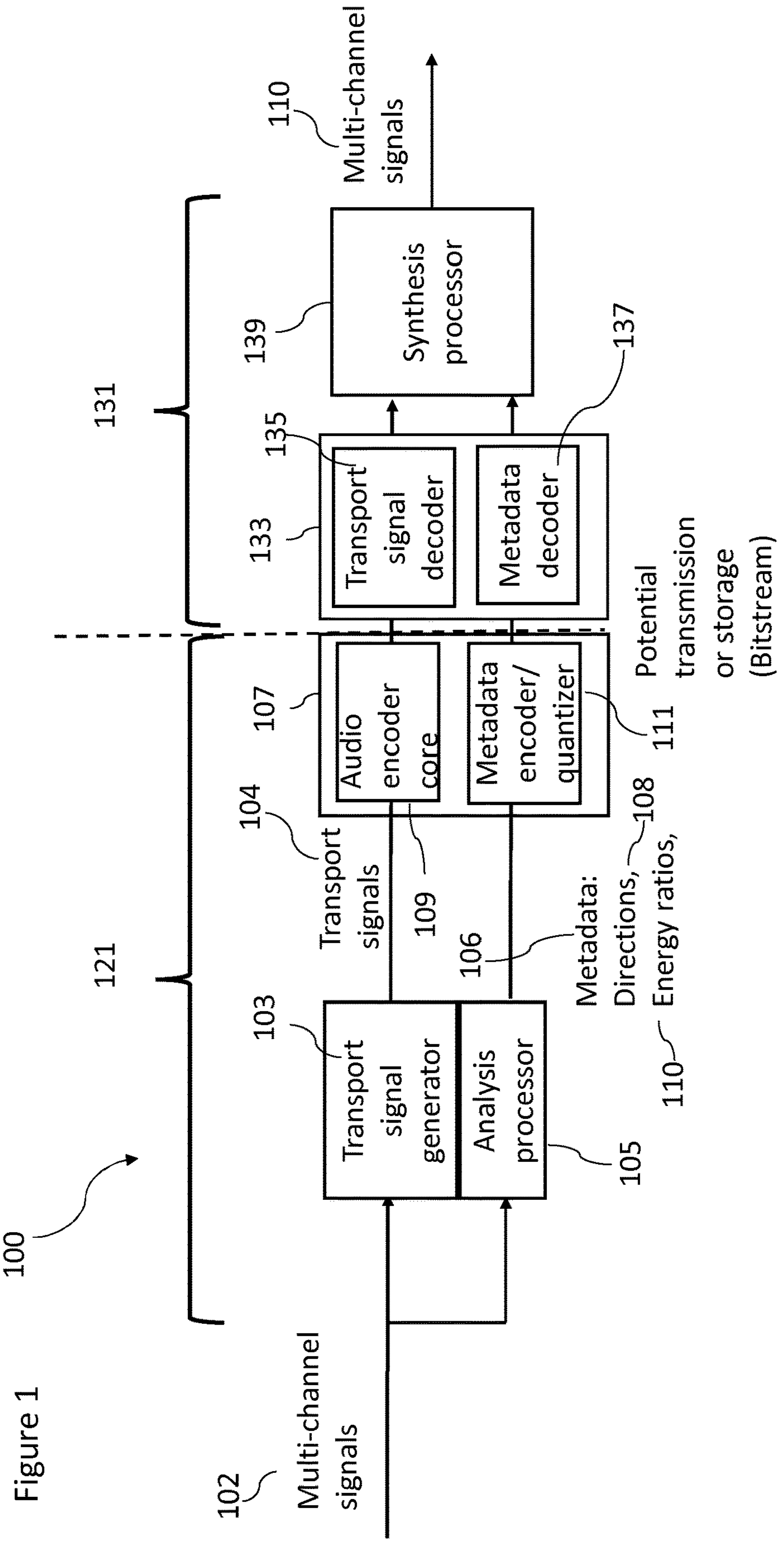
FIG. 1 shows schematically a system of apparatus suitable for implementing some embodiments.

The following describes in further detail suitable apparatus and possible mechanisms for the provision of combining and encoding spatial analysis derived metadata parameters. In the following discussions a multi-channel system is discussed with respect to a multi-channel microphone implementation. However as discussed above the input format may be any suitable input format, such as multi-channel loudspeaker, Ambisonics (FOA/HOA) etc. It is understood that in some embodiments the channel location is based on a location of the microphone or is a virtual location or direction.

Furthermore in the following examples the output of the example system is a multi-channel loudspeaker arrangement. In other embodiments the output may be rendered to the user via means other than loudspeakers. The multi-channel loudspeaker signals may be also generalised to be two or more playback audio signals.

As discussed above directional metadata associated with the audio signals may comprise multiple parameters (such as multiple directions, and associated with each direction a direct-to-total ratio, distance, etc.) per time-frequency tile. The directional metadata may also comprise other parameters or may be associated with other parameters which are considered to be non-directional (such as surround coherence, diffuse-to-total energy ratio, remainder-to-total energy ratio) but when combined with the directional parameters are able to be used to define the characteristics of the audio scene. For example a reasonable design choice which is able to produce a good quality output is one where the directional metadata comprises two directions for each time-frequency subframe (and associated with each direction direct-to-total ratios, distance values etc) are determined. However as also discussed above, bandwidth and/or storage limitations may require a codec not to send directional metadata parameter values for each frequency band and temporal sub-frame.

The current proposals include those disclosed in GB patent application 1811071.8 which has considered the lossy compression of metadata and for PCT/FI2019/050675 when very low number of bits are available for a given subband, a vector quantization approach has been discussed. Even though only up to 9 bits codebook, the vector quantizer approach increases the table ROM of the codec with approximately 4 kB of memory used for 4 dimensional codebooks of 2, 3, 4, . . . , and 9 bits.

The concept as discussed in the embodiments herein is the provision of a low complexity codec with low ROM imprint which considers the characteristics of the multichannel directional metadata.

Although codecs such as UK patent application GB2000465.1 have considered the lossy compression of metadata. The flexible azimuth codebook presented is uniformly distributed which means that for 3 bits only front, back, lateral and mid positions can be represented. However what would be useful would be representations taking into consideration channel positions of a multichannel format. Additionally the embodiments as discussed herein improve performance over a non-uniform scalar codebook implementation as there is not the requirement to store codebooks for each possible number of bits (in other words the embodiments require less codebook storage).

In the following embodiments the codec employs a uniform quantizer structure, but can selectively implement (for example based on a channel input format) an adjustable parameterized companding function.

With respect to FIG. 1 an example apparatus and system for implementing embodiments of the application are shown. The system 100 is shown with an 'analysis' part 121 and a 'synthesis' part 131. The 'analysis' part 121 is the part from receiving the multi-channel signals up to an encoding of the directional metadata and transport signal and the 'synthesis' part 131 is the part from a decoding of the encoded directional metadata and transport signal to the presentation of the re-generated signal (for example in multi-channel loudspeaker form).

In the following description the 'analysis' part 121 is described as a series of parts however in some embodiments the part may be implemented as functions within the same functional apparatus or part. In other words in some embodiments the 'analysis' part 121 is an encoder comprising at least one of the transport signal generator or analysis processor as described hereafter.

The input to the system 100 and the 'analysis' part 121 is the multi-channel signals 102. The 'analysis' part 121 may comprise a transport signal generator 103, analysis processor 105, and encoder 107. In the following examples a microphone channel signal input is described, however any suitable input (or synthetic multi-channel) format may be implemented in other embodiments. In such embodiments the directional metadata associated with the audio signals may be a provided to an encoder as a separate bit-stream. The multi-channel signals are passed to a transport signal generator 103 and to an analysis processor 105.

In some embodiments the transport signal generator 103 is configured to receive the multi-channel signals and generate a suitable audio signal format for encoding. The transport signal generator 103 can for example generate a stereo or mono audio signal. The transport audio signals generated by the transport signal generator can be any known format. For example when the input is one where the audio signals input are mobile phone microphone array audio signals, the transport signal generator 103 can be configured to select a left-right microphone pair, and apply any suitable processing to the audio signal pair, such as automatic gain control, microphone noise removal, wind noise removal, and equalization. In some embodiments when the input is a first order Ambisonic/higher order Ambisonic (FOA/HOA) signal, the transport signal generator can be configured to formulate directional beam signals towards left and right directions, such as two opposing cardioid signals. Additionally in some embodiments when the input is a loudspeaker surround mix and/or objects, then the transport signal generator 103 can be configured to generate a downmix signal that combines left side channels to a left downmix channel, combined right side channels to a right downmix channel and adds centre channels to both transport channels with a suitable gain.

In some embodiments the transport signal generator is bypassed (or in other words is optional). For example, in some situations where the analysis and synthesis occur at the same device at a single processing step, without intermediate processing there is no transport signal generation and the input audio signals are passed unprocessed. The number of transport channels generated can be any suitable number and not for example one or two channels.

The output of the transport signal generator 103 can be passed to an encoder 107.

In some embodiments the analysis processor 105 is also configured to receive the multi-channel signals and analyse the signals to produce directional metadata 106 associated with the multi-channel signals and thus associated with the transport signals 104.

The analysis processor 105 may be configured to generate the directional metadata parameters which may comprise, for each time-frequency analysis interval, at least one direction parameter 108 and at least one energy ratio parameter 110 (and in some embodiments other parameters, of which a non-exhaustive list includes number of directions, surround coherence, diffuse-to-total energy ratio, remainder-to-total energy ratio, a spread coherence parameter, and distance parameter). The direction parameter may be represented in any suitable manner, for example as spherical co-ordinates denoted as azimuth $\varphi(k,n)$ and elevation $\theta(k,n)$.

In some embodiments the number of the directional metadata parameters may differ from time-frequency tile to time-frequency tile. Thus for example in band X all of the directional metadata parameters are obtained (generated) and transmitted, whereas in band Y only one of the directional metadata parameters is obtained and transmitted, and furthermore in band Z no parameters are obtained or transmitted. A practical example of this may be that for some time-frequency tiles corresponding to the highest frequency band some of the directional metadata parameters are not required for perceptual reasons. The directional metadata 106 may be passed to an encoder 107.

In some embodiments the analysis processor 105 is configured to apply a time-frequency transform for the input signals. Then, for example, in time-frequency tiles when the input is a mobile phone microphone array, the analysis processor could be configured to estimate delay-values between microphone pairs that maximize the inter-microphone correlation. Then based on these delay values the analysis processor may be configured to formulate a corresponding direction value for the directional metadata. Furthermore the analysis processor may be configured to formulate a direct-to-total ratio parameter based on the correlation value.

In some embodiments, for example where the input is a FOA signal, the analysis processor 105 can be configured to determine an intensity vector. The analysis processor may then be configured to determine a direction parameter value for the directional metadata based on the intensity vector. A diffuse-to-total ratio can then be determined, from which a direct-to-total ratio parameter value for the directional metadata can be determined. This analysis method is known in the literature as Directional Audio Coding (DirAC).

In some examples, for example where the input is a HOA signal, the analysis processor 105 can be configured to divide the HOA signal into multiple sectors, in each of which the method above is utilized. This sector-based method is known in the literature as higher order DirAC (HO-DirAC). In these examples, there is more than one simultaneous direction parameter value per time-frequency tile corresponding to the multiple sectors.

Additionally in some embodiments where the input is a loudspeaker surround mix and/or audio object(s) based signal, the analysis processor can be configured to convert the signal into a FOA/HOA signal(s) format and to obtain direction and direct-to-total ratio parameter values as above.

The encoder 107 may comprise an audio encoder core 109 which is configured to receive the transport audio signals 104 and generate a suitable encoding of these audio signals. The encoder 107 can in some embodiments be a computer (running suitable software stored on memory and on at least one processor), or alternatively a specific device utilizing, for example, FPGAs or ASICs. The audio encoding may be implemented using any suitable scheme.

The encoder 107 may furthermore comprise a directional metadata encoder/quantizer 111 which is configured to receive the directional metadata and output an encoded or compressed form of the information. In some embodiments the encoder 107 may further interleave, multiplex to a single data stream or embed the directional metadata within encoded downmix signals before transmission or storage shown in FIG. 1 by the dashed line. The multiplexing may be implemented using any suitable scheme.

In some embodiments the transport signal generator 103 and/or analysis processor 105 may be located on a separate device (or otherwise separate) from the encoder 107. For example in such embodiments the directional metadata (and associated non-directional metadata) parameters associated with the audio signals may be a provided to the encoder as a separate bit-stream.

In some embodiments the transport signal generator 103 and/or analysis processor 105 may be part of the encoder 107, i.e., located inside of the encoder and be on a same device.

In the following description the 'synthesis' part 131 is described as a series of parts however in some embodiments the part may be implemented as functions within the same functional apparatus or part.

In the decoder side, the received or retrieved data (stream) may be received by a decoder/demultiplexer 133. The decoder/demultiplexer 133 may demultiplex the encoded streams and pass the audio encoded stream to a transport signal decoder 135 which is configured to decode the audio signals to obtain the transport audio signals. Similarly the decoder/demultiplexer 133 may comprise a metadata decoder 137 which is configured to receive the encoded directional metadata (for example a direction index representing a direction parameter value) and generate directional metadata.

The decoder/demultiplexer 133 can in some embodiments be a computer (running suitable software stored on memory and on at least one processor), or alternatively a specific device utilizing, for example, FPGAs or ASICs.

The decoded metadata and transport audio signals may be passed to a synthesis processor 139.

The system 100 'synthesis' part 131 further shows a synthesis processor 139 configured to receive the transport audio signal and the directional metadata and re-creates in any suitable format a synthesized spatial audio in the form of multi-channel signals 110 (these may be multichannel loudspeaker format or in some embodiments any suitable output format such as binaural or Ambisonics signals, depending on the use case) based on the transport signals and the directional metadata.

The synthesis processor 139 thus creates the output audio signals, e.g., multichannel loudspeaker signals or binaural signals based on any suitable known method. This is not explained here in further detail. However, as a simplified example, the rendering can be performed for loudspeaker output according to any of the following methods. For example the transport audio signals can be divided to direct and ambient streams based on the direct-to-total and diffuse-to-total energy ratios. The direct stream can then be rendered based on the direction parameter(s) using amplitude panning. The ambient stream can furthermore be rendered using decorrelation. The direct and the ambient streams can then be combined.

The output signals can be reproduced using a multichannel loudspeaker setup or headphones which may be head-tracked.

It should be noted that the processing blocks of FIG. 1 can be located in same or different processing entities. For example, in some embodiments, microphone signals from a mobile device are processed with a spatial audio capture system (containing the analysis processor and the transport signal generator), and the resulting spatial metadata and transport audio signals (e.g., in the form of a MASA stream) are forwarded to an encoder (e.g., an IVAS encoder), which contains the encoder. In other embodiments, input signals (e.g., 5.1 channel audio signals) are directly forwarded to an encoder (e.g., an IVAS encoder), which contains the analysis processor, the transport signal generator, and the encoder.

In some embodiments there can be two (or more) input audio signals, where the first audio signal is processed by the apparatus shown in FIG. 1 (resulting in data as an input for the encoder) and the second audio signal is directly forwarded to an encoder (e.g., an IVAS encoder), which contains the analysis processor, the transport signal generator, and the encoder. The audio input signals may then be encoded in the encoder independently or they may, e.g., be combined in the parametric domain according to what may be called, e.g., MASA mixing.

In some embodiments there may be a synthesis part which comprises separate decoder and synthesis processor entities or apparatus, or the synthesis part can comprise a single entity which comprises both the decoder and the synthesis processor. In some embodiments, the decoder block may process in parallel more than one incoming data stream. In the application the term synthesis processor may be interpreted as an internal or external renderer.

Therefore in summary first the system (analysis part) is configured to receive multi-channel audio signals. Then the system (analysis part) is configured to generate a suitable transport audio signal (for example by selecting some of the audio signal channels). The system is then configured to encode for storage/transmission the transport audio signal. After this the system may store/transmit the encoded transport audio signal and metadata. The system may retrieve/receive the encoded transport audio signal and metadata. Then the system is configured to extract the transport audio signal and metadata from encoded transport audio signal and metadata parameters, for example demultiplex and decode the encoded transport audio signal and metadata parameters.

The system (synthesis part) is configured to synthesize an output multi-channel audio signal based on extracted transport audio signal and metadata.

Figure 2:
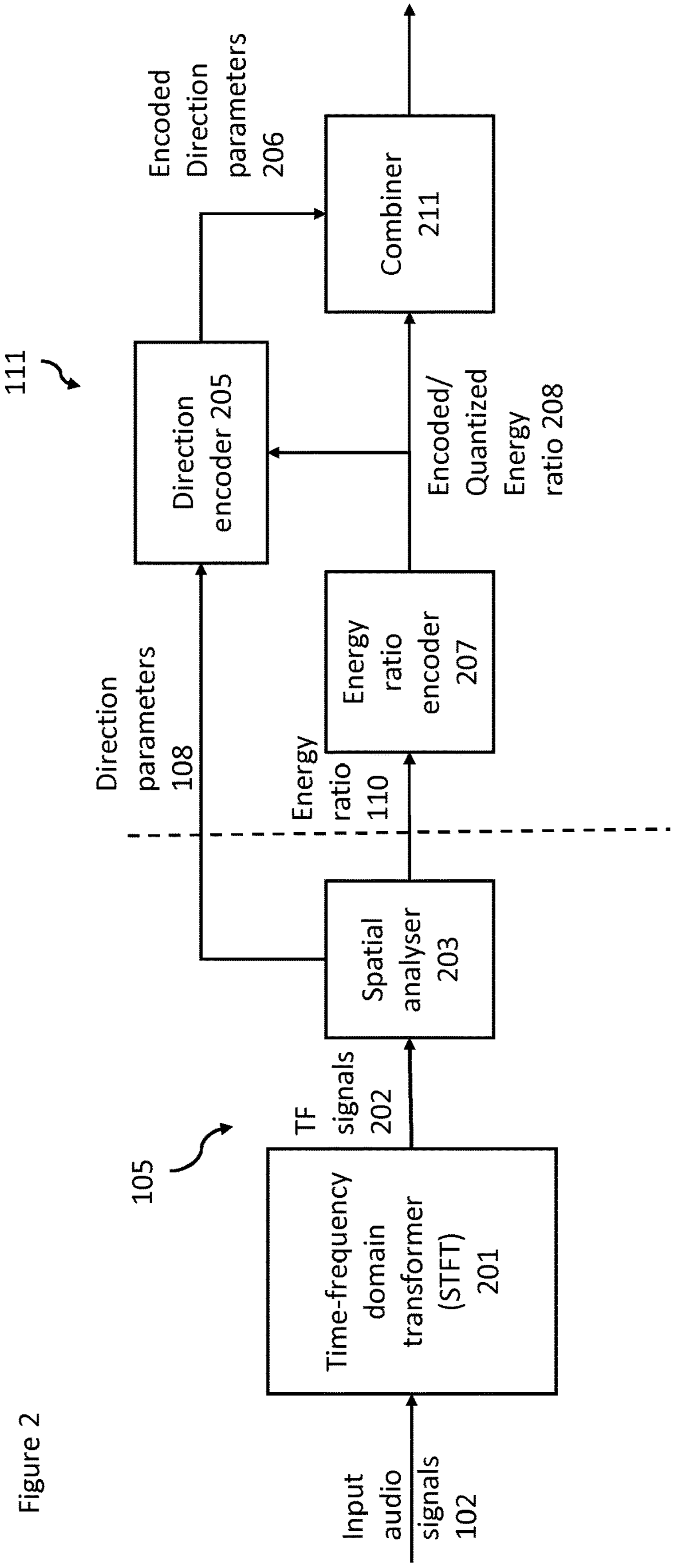
FIG. 2 shows schematically the encoder according to some embodiments.

With respect to FIG. 2 an example analysis processor 105 and Metadata encoder/quantizer 111 (as shown in FIG. 1) according to some embodiments is described in further detail.

The analysis processor 105 in some embodiments comprises a time-frequency domain transformer 201.

In some embodiments the time-frequency domain transformer 201 is configured to receive the multi-channel signals 102 and apply a suitable time to frequency domain transform such as a Short Time Fourier Transform (STFT) in order to convert the input time domain signals into a suitable time-frequency signals. These time-frequency signals may be passed to a spatial analyser 203.

Thus for example the time-frequency signals 202 may be represented in the time-frequency domain representation by $$s_i(b,n),$$

where b is the frequency bin index and n is the time-frequency block (frame) index and i is the channel index. In another expression, n can be considered as a time index with a lower sampling rate than that of the original time-domain signals. These frequency bins can be grouped into subbands that group one or more of the bins into a subband of a band index k=0, . . . , K−1. Each subband k has a lowest bin $b_{k,low}$ and a highest bin $b_{k,high}$, and the subband contains all bins from $b_{k,low}$ to $b_{k,high}$. The widths of the subbands can approximate any suitable distribution. For example the Equivalent rectangular bandwidth (ERB) scale or the Bark scale.

In some embodiments the analysis processor 105 comprises a spatial analyser 203. The spatial analyser 203 may be configured to receive the time-frequency signals 202 and based on these signals estimate direction parameters 108. The direction parameters may be determined based on any audio based 'direction' determination.

For example in some embodiments the spatial analyser 203 is configured to estimate the direction with two or more signal inputs. This represents the simplest configuration to estimate a 'direction', more complex processing may be performed with even more signals.

The spatial analyser 203 may thus be configured to provide at least one azimuth and elevation for each frequency band and temporal time-frequency block within a frame of an audio signal, denoted as azimuth φ(k,n) and elevation θ(k,n). The direction parameters 108 may be also be passed to a direction encoder 205.

The spatial analyser 203 may also be configured to determine an energy ratio parameter 110. The energy ratio may be considered to be a determination of the energy of the audio signal which can be considered to arrive from a direction. The direct-to-total energy ratio r(k,n) can be estimated, e.g., using a stability measure of the directional estimate, or using any correlation measure, or any other suitable method to obtain a ratio parameter. The energy ratio may be passed to an energy ratio encoder 207.

The spatial analyser 203 may furthermore be configured to determine a number of coherence parameters 112 which may include surrounding coherence (γ(k, n)) and spread coherence (ζ(k, n)), both analysed in time-frequency domain.

Therefore in summary the analysis processor is configured to receive time domain multichannel or other format such as microphone or ambisonic audio signals.

Following this the analysis processor may apply a time domain to frequency domain transform (e.g. STFT) to generate suitable time-frequency domain signals for analysis and then apply direction analysis to determine direction and energy ratio parameters.

The analysis processor may then be configured to output the determined parameters.

Although directions, energy ratios, and coherence parameters are here expressed for each time index n, in some embodiments the parameters may be combined over several time indices. Same applies for the frequency axis, as has been expressed, the direction of several frequency bins b could be expressed by one direction parameter in band k consisting of several frequency bins b. The same applies for all of the discussed spatial parameters herein.

In some embodiments the directional data may be represented using 16 bits such that each azimuth parameter is approximately represented on 9 bits, and the elevation on 7 bits. In such embodiments the energy ratio parameter may be represented on 8 bits. For each frame there may be N subbands (where N may be between 1 and 24 and may be fixed at 5), and M time frequency (TF) blocks (where the value of M may be M=4). Thus in this example there are (16+8)×M×N bits needed to store the uncompressed direction and energy ratio metadata for each frame.

As also shown in FIG. 2 an example metadata encoder/quantizer 111 is shown according to some embodiments.

The metadata encoder/quantizer 111 may comprise a direction encoder 205. The direction encoder 205 is configured to receive the direction parameters (such as the azimuth φ(k, n) and elevation θ(k, n) 108 (and in some embodiments an expected bit allocation) and from this generate a suitable encoded output. In some embodiments the encoding is based on a quantization operation where the quantization or codebook positions is one where an arrangement of spheres forms a spherical grid arranged in rings on a 'surface' sphere which are defined by a look up table defined by the determined quantization resolution. In other words the spherical grid uses the idea of covering a sphere with smaller spheres and considering the centres of the smaller spheres as points defining a grid of almost equidistant directions. The smaller spheres therefore define cones or solid angles about the centre point which can be indexed according to any suitable indexing algorithm. Although spherical quantization is described here any suitable linear quantization grid may be used.

The quantized values may then be further combined by determining whether corresponding directional parameter elevation values are similar enough to employ the embedded flexible border codebook.

The encoded direction parameters 206 may then be passed to the combiner 211.

The metadata encoder/quantizer 111 may comprise an energy ratio encoder 207. The energy ratio encoder 207 is configured to receive the energy ratios and determine a suitable encoding for compressing the energy ratios for the sub-bands and the time-frequency blocks. For example in some embodiments the energy ratio encoder 207 is configured to use 3 bits to encode each energy ratio parameter value.

Furthermore in some embodiments rather than transmitting or storing all energy ratio values for all TF blocks, only one weighted average value per sub-band is transmitted or stored. The average may be determined by taking into account the total energy of each time block, favouring thus the values of the sub-bands having more energy.

In such embodiments the quantized energy ratio value 208 is the same for all the TF blocks of a given sub-band.

In some embodiments the energy ratio encoder 207 is further configured to pass the quantized (encoded) energy ratio value 208 to the combiner 211.

The metadata encoder/quantizer 111 may comprise a combiner 211. The combiner is configured to receive the encoded (or quantized/compressed) directional parameters and energy ratio parameters and combine these to generate a suitable output (for example a metadata bit stream which may be combined with the transport signal or be separately transmitted or stored from the transport signal).

Figure 3:
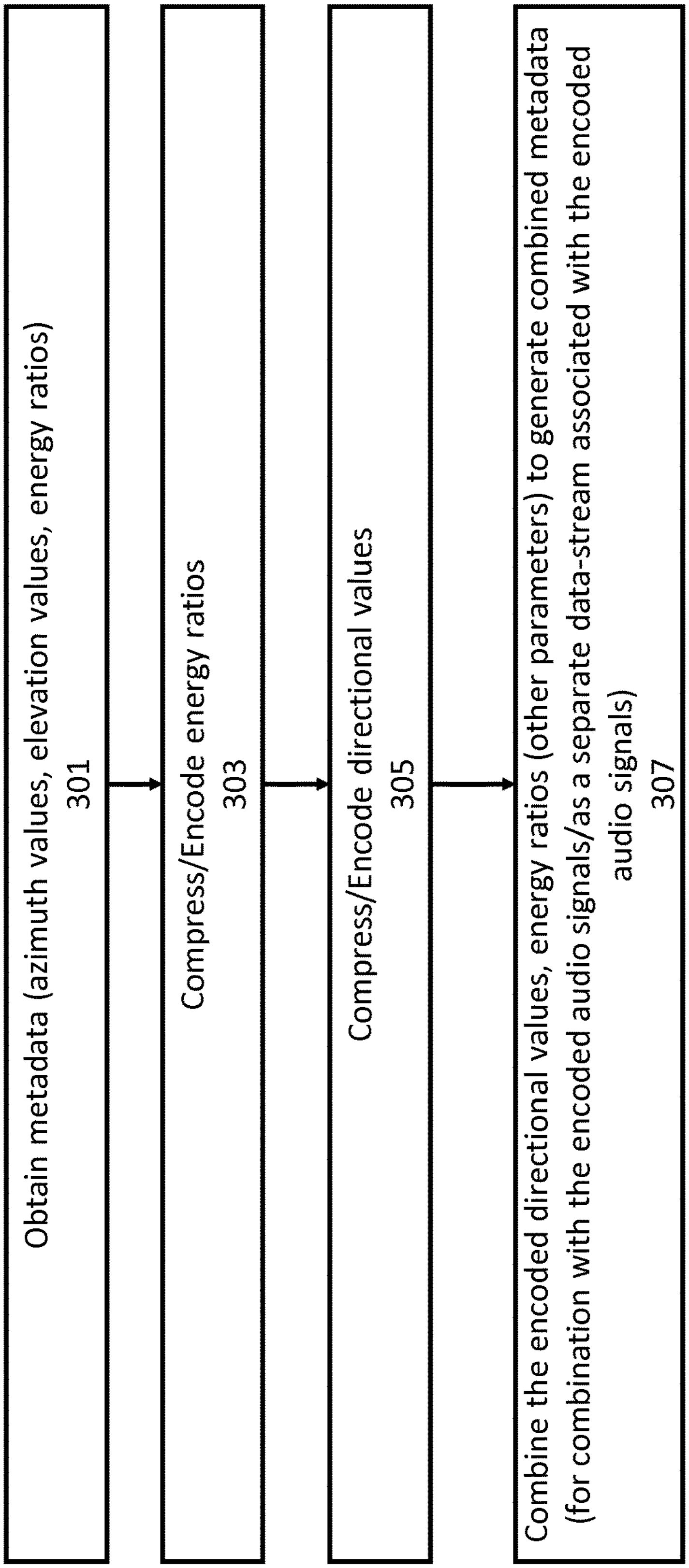
FIG. 3 shows a flow diagram of the operations of the encoder as shown in FIG. 2 according to some embodiments.

With respect to FIG. 3 is shown an example operation of the direction encoder/quantizer as shown in FIG. 2 according to some embodiments.

The initial operation is obtaining the metadata (such as azimuth values, elevation values, energy ratios, etc) as shown in FIG. 3 by step 301.

The directional values (elevation, azimuth) may then be compressed or encoded (for example by applying a spherical quantization, or any suitable compression) as shown in FIG. 3 by step 303.

The energy ratio values are compressed or encoded (for example by generating a weighted average per sub-band and then quantizing these as a 3 bit value) as shown in FIG. 3 by step 305.

The encoded directional values and energy ratios (and in some embodiments other parametric parameters such as coherence values) are then combined to generate the encoded metadata as shown in FIG. 3 by step 307. In some embodiments the encoded directional values (and energy ratios) are multiplexed within encoded transport audio signals data stream directly.

Figure 4:
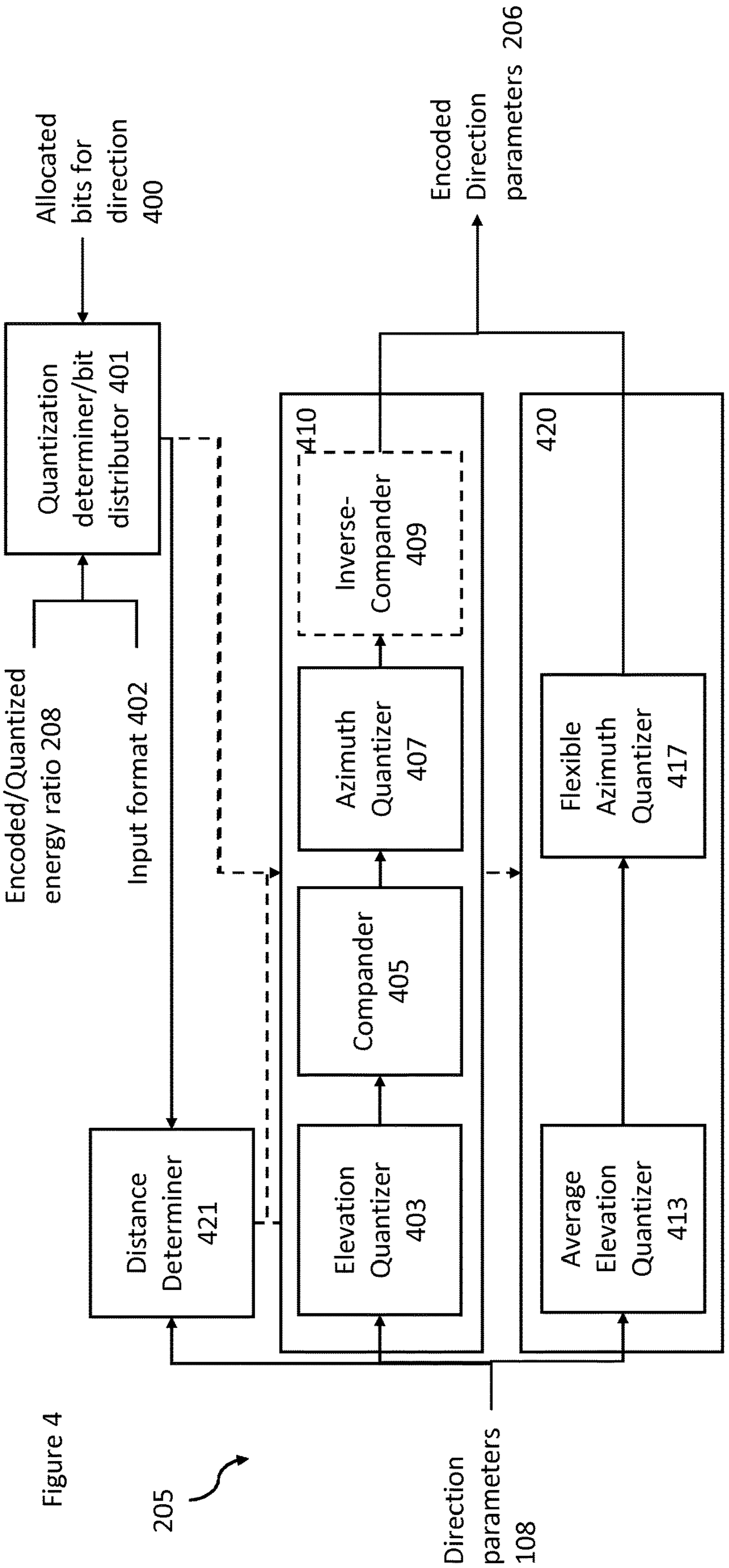
FIG. 4 shows schematically the direction encoder as shown in FIG. 2 according to some embodiments.

The direction encoder 205 is shown in further detail with respect to FIG. 4.

The direction encoder may in some embodiments comprise a quantization determiner/bit distributor 401. The quantization determiner/bit distributor 401 may be configured to receive the encoded/quantized energy ratio 208 for each sub-band. Furthermore the quantization determiner/bit distributor 401 may be configured to receive an allocated bits for direction encoding value 400 defining how many bits have been allocated for encoding the direction parameter for the time-frequency bin. For example where the audio metadata consists of azimuth, elevation, and energy ratio data for each sub-band, the directional data may be represented on 16 bits such that the azimuth is approximately represented with 9 bits, and the elevation with 7 bits. The energy ratio may be represented by 8 bits. For each frame there are N subbands and M=4 time frequency (TF) blocks, making that (16+8)×M×N bits to be needed to store the uncompressed metadata for each frame. The number of subbands can be any number between 1 and 24 depending on the codec functioning mode. For the lower bitrates the number of subband is fixed to a lower value, e.g. N=5, in others it can change from frame to frame and depend on the number of similar time frequency tiles.

In some embodiments the encoding of the energy ratio may use 3 bits to encode each energy ratio value. In addition, instead of transmitting all energy ratio values for all TF blocks, only one weighted average value per subband is transmitted. The average is computed by taking into account the total energy of each time block, favouring thus the values of the subbands having more energy.

Furthermore in some embodiments the quantization determiner/bit distributor 401 can be configured to obtain an input format indicator 402. The input format indicator 402 can be obtained based on any suitable method. For example in some embodiments the input format indicator is determined by the apparatus based on analysis of the input audio signals. In some further embodiments the input format indicator is obtained by receiving a suitable indicator which is associated with the input audio signals (for example as metadata associated with the input audio signals).

The quantization determiner/bit distributor 401 can then from these values determine encoding control information such as the number of bits are allocated for encoding each sub-band and the quantization resolution for the azimuth and the elevation for all the TF-tile (the time block) of the current sub-band and furthermore control the quantization/encoding operation. The quantization resolution may for example be set by allowing a predefined number of bits given by the value of the energy ratio and the allocated bits.

The control may be such that at low bitrates (which may be after assigning the number of bits per time frequency time, the available bit budget for each azimuth element of the direction being 2-5 bits) and having obtained an indicator that the input is a multichannel format data, that instead of using directly the azimuth uniform quantizer corresponding to the available number of bits, a companded version of the azimuth value is uniformly quantized and then companded back.

In some embodiments quantization determiner/bit distributor 401 is configured to determine whether the number of bits to encode the sub-band over the TF-tile is less than a determined threshold. For example where there are less than 11 bits to encode the elevation elements for a sub-band over 4 TF-tiles then the quantization determiner/bit distributor 401 may be configured to control the encoding/quantization operation to check whether an average elevation/flexible azimuth quantization is better than an elevation/azimuth companded quantization.

In some embodiments the encoder 205 comprises a distance determiner 421. The distance determiner 421 may be controlled by the quantization determiner/bit distributor 401 such that when where the maximum number of bits allocated for each TF-tile of the current sub-band is less than or equal to the threshold then distances d1 and d2 are determined. Where the angular distance is calculated as $$d=\cos\widehat{\theta_{av}}\cos\theta_i\cos(\phi_i-\phi_\iota)-\sin\theta_i\sin\widehat{\theta_{av}}$$

where $\theta_{av}$ is the average elevation. The d1 distance is the estimate of the quantization distortion when using a compander encoding and the d2 distance the estimate of the quantization distortion when using an average elevation/flexible azimuth encoding.

In some embodiments the estimations are made based on the unquantized angles and the actual values in each of the codebook, without calculating the quantized values.

In some embodiments the variance of the elevation is considered, because if its variance is larger than a determined value then more than one elevation value for the sub-band is encoded. This is further detailed in PCT/FI2019/050675.

The distance determiner 421 is configured to determine whether the distance d2 is less than the distance d1.

The encoder 205 in some embodiments comprises an average elevation/flexible azimuth encoder 420. The average elevation/flexible azimuth encoder 420 can be controlled by the quantization determiner/bit distributor 401 determination to encode the elevation and azimuth values of each TF block within the number of bits allotted for the current sub-band when the maximum number of bits allocated for each TF block of the current sub-band is more than to the bits allowed.

Additionally the average elevation/flexible azimuth encoder 420 can be controlled by the distance determiner 421 to encode the elevation and azimuth values of each TF tile within the number of bits allotted for the current sub-band when the distance d2 is less than the distance d1. In other words to encode when the estimate of the quantization distortion when using the encoding is less than the estimate of the quantization distortion when using a companding method.

The average elevation encoder/flexible azimuth encoder 420 comprises an average elevation quantizer 413. The average elevation quantizer 413 is configured to determine an average elevation value for the sub-band over the TF-tile and then encode (and use) the average elevation value. The average elevation value is then quantized based on a determined quantization grid/configuration. For example in some embodiments the average elevation quantizer 413 is configured to encode the average elevation value with 1 or 2 bits (1 bit for value 0 degrees, 2 bits for +/−36 degrees).

Additionally the average elevation encoder/flexible border encoder 420 comprises a flexible azimuth quantizer configured to employ a flexible borders embedded codebook for the azimuth values of each of the considered TF-tiles. In some embodiments the azimuth encoding borders are (in degrees) 0, +30, −30, +110, −110, +135, −135. All azimuth values are quantized within these values. Then a number of bits are estimated (which may include an entropy coding, for example Golomb-Rice encoding reduction) and where too many bits are used the borders directions are gradually moved to the front with less damage (less distortion).

In some embodiments the encoder 205 comprises a compander encoder 410. The compander encoder 410 comprises an elevation quantizer 403 configured to quantize each elevation element in the TF-tile for the sub-band.

Thus in some embodiments the elevation quantizer 415 is configured to determine a quantized elevation element value (or quantization information) based on the elevation element value and a quantization grid or other quantization configuration.

The quantized elevation information may be passed to a compander 405 and in some embodiments an inverse compander 409.

The encoder 205 may furthermore comprise a compander 405. The compander 405 may be configured to receive the azimuth element of the directional parameter 108 and also be configured to receive the quantized elevation value and control from the quantization determiner/bit distributor 401.

The compander 405 can then be configured to select a companding function based on the quantized elevation value. In some embodiments the companding function may also be determined based on the input channel format which may be provided as a control or indicator from the quantization determiner/bit distributor 401. Thus for example there may be one or more companding functions associated with a determined 5.1 channel input format and one or more companding functions associated with a determined 7.1 channel input format.

The companding function can then be applied to the azimuth element of the directional parameter to generate a companded azimuth element which can be passed to an azimuth quantizer 407.

Figure 6:
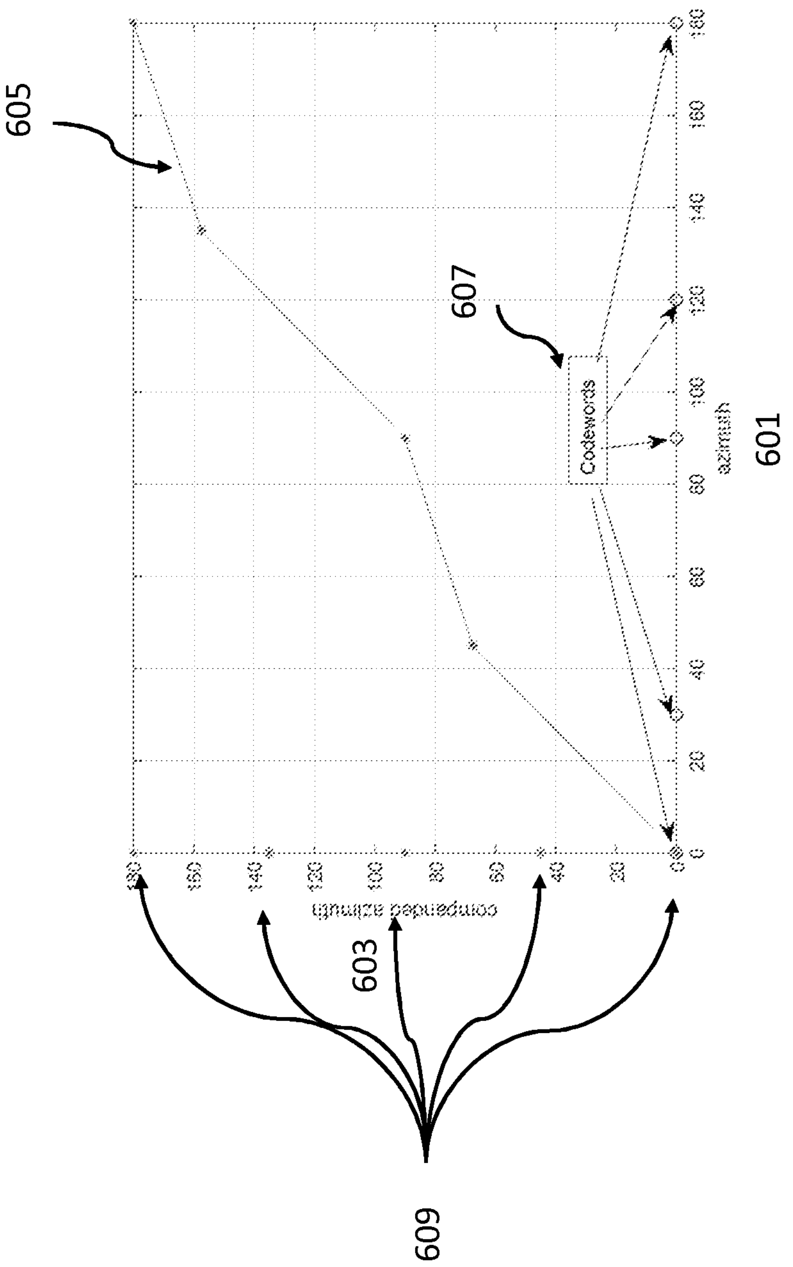
FIGS. 6 and 7 show a compander functions suitable for implementing in the direction encoder as shown in FIG. 4.
Figure 7:
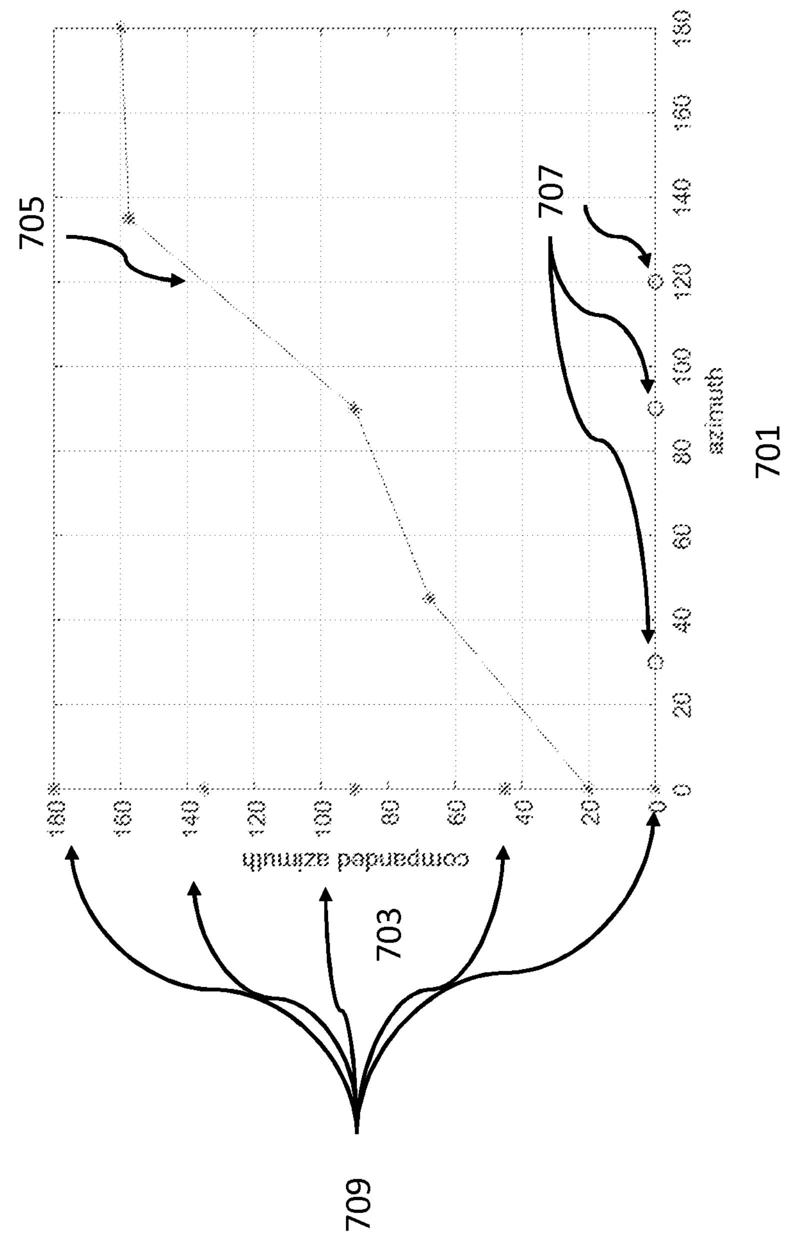

With respect to FIGS. 6 and 7 are shown example companding functions. With respect to FIG. 6 is shown a first companding function which may for example be selected when the elevation is zero. The input azimuth (the X-axis) 601 values may be mapped using the function 605 to the companded azimuth (the Y-axis) 603 values. Furthermore are shown on FIG. 6 a series of original codewords (quantization values shown as circles) 607 and the companded codewords 609 (quantization values shown as asterisks). The resulting codewords are such that the resolution is improved in the front and on the sides, where direct signals are more likely to originate from in a multi-channel setup. In FIG. 6 corresponds there are 5 values and they correspond to the 3 bits quantizer, as three more codewords are for negative azimuth values. Although the example shown herein is a 3 bit codeword example the same companding function can be used for 4 or 5 or more bits.

When the quantized elevation is larger than a given threshold, the front directions are less present and the companding function is changed according to the one in FIG. 7. With respect to FIG. 7 is shown a second companding function which may for example be selected when the elevation is not zero. The input azimuth (the X-axis) 701 values may be mapped using the function 705 to the companded azimuth (the Y-axis) 703 values. Furthermore are shown on FIG. 7 a series of original codewords (quantization values shown as circles) 707 and the companded codewords 709 (quantization values shown as asterisks). From the companding function in FIG. 7 is defined there are very few points that are quantized to zero or +/−180. The percentage of these points can be adjusted by the front/back activation values of the companding function i.e. the first and last y-value in the definition of the companding function (20, and 160 respectively).

The output of the compander 405 is then passed to the azimuth quantizer 407 wherein the quantization (such as shown by the codewords in FIGS. 6 and 7) are applied.

The compander encoder 410 may furthermore comprise an azimuth quantizer 407 which is configured to receive the output of the compander 405 and quantize the azimuth values. These values are then passed to the inverse compander 409. In some embodiments the inverse-compander 409 is implemented within the decoder 133 and therefore the values are output as the quantized azimuth element from the compander encoder 410.

The compander encoder 410 may in some furthermore comprise an inverse-compander 409. The inverse-compander 409 may be configured to receive the quantized companded azimuth element of the directional parameter and also be configured to receive the quantized companded elevation value and control from the quantization determiner/bit distributor 401.

The inverse-compander 409 can then be configured to select an inverse-companding function based on the quantized elevation value. In some embodiments the inverse-companding function may also be determined based on the input channel format which may be provided as a control or indicator from the quantization determiner/bit distributor 401. The inverse-companding function can then be applied to the quantized companded azimuth element of the directional parameter to generate a quantized azimuth element.

The inverse-companding function would be the inverse of the companding function applied in the compander 405. In some embodiments the compander, quantizer and inverse compander are the same functional element.

In some embodiments the quantization determiner/bit distributor 401 when determining that there are more than the threshold bit allocation (for example 11 bits) then the companding encoder is employed to encode the sub-band for the TF-tile.

Figure 5:
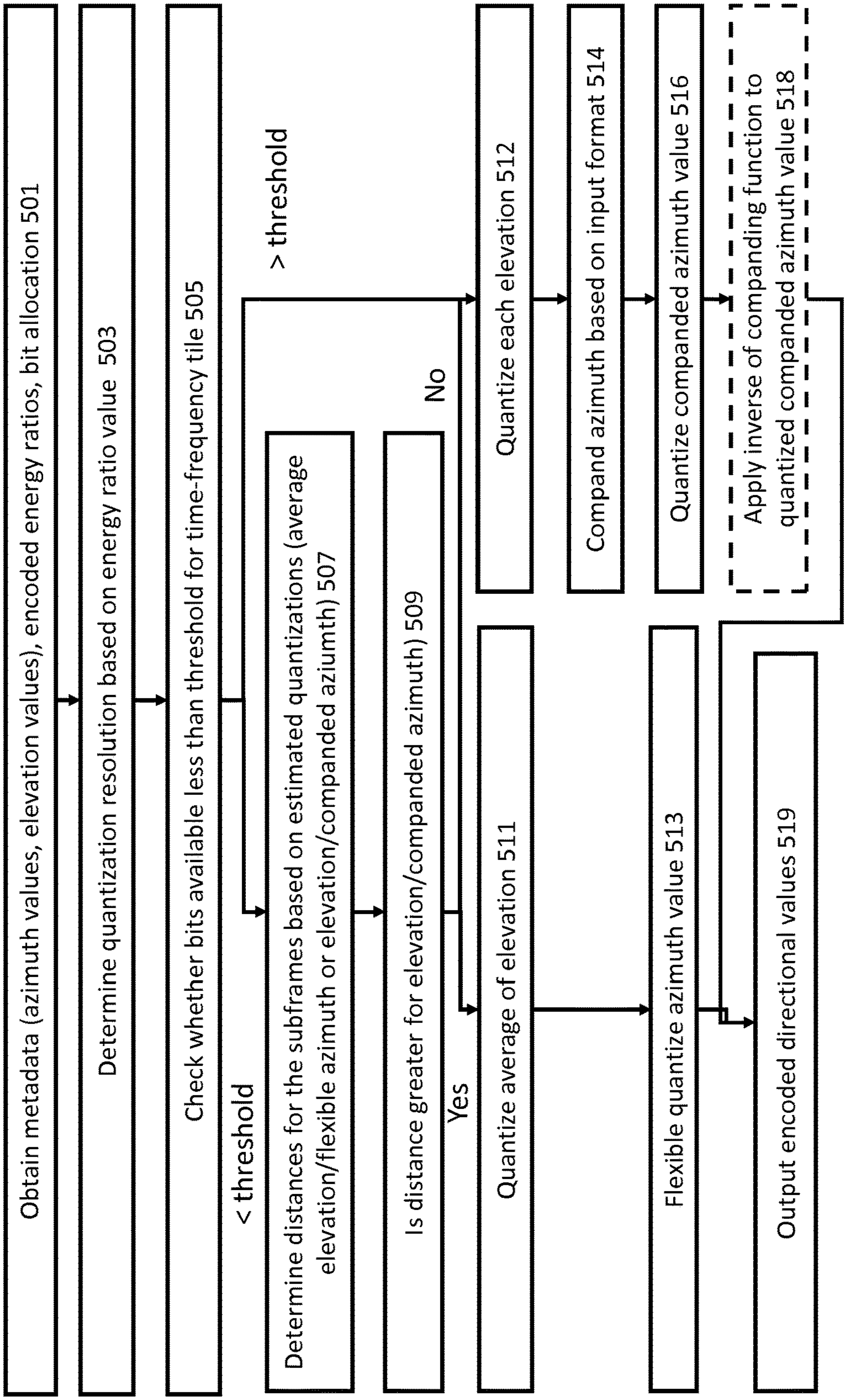
FIG. 5 shows a flow diagram of the operations of the direction encoder as shown in FIG. 4 according to some embodiments.

With respect to FIG. 5 is shown a flow diagram showing the operations of the direction encoder 205 as shown in FIG. 4.

The initial operation is obtaining the direction metadata (such as azimuth values, elevation values, etc), the encoded energy ratio values and the bit allocation as shown in FIG. 5 by step 501.

The quantization resolution is then initially determined based on the energy ratio value as shown in FIG. 5 by step 503.

An encoding check (where the number of available bits is checked against a threshold value) is shown in FIG. 5 by step 505.

Where the number of available bits is more than a threshold then the companding azimuth quantization operation as shown in steps 512, 514, 516 and 518 as described below is implemented.

Where the number of available bits is less than a threshold then a distance (error or similarity) check is made to determine the losses between quantizing based on the companding azimuth quantization operation as shown in steps 512, 514, 516 and 518 as described below and the average elevation/flexible azimuth quantization operation as shown in steps 511, 513 when compared to the direction parameters.

Where the error distance is greater for the elevation/companded azimuth quantization operation as shown by the check operation in FIG. 5 by step 509 then the direction parameters/values can be encoded based on the average elevation/flexible azimuth quantization operation as shown in steps 511, 513.

Thus the average elevation is quantized based on the determined quantization based on the quantized energy ratio value as shown in FIG. 5 by step 511.

Then the azimuth element is quantized based on a flexible encoding operation such as described above as shown in FIG. 5 by step 513.

Where the error distance is not greater for the elevation/companded azimuth quantization operation as shown by the check operation in FIG. 5 by step 509 then the direction parameters/values can be encoded based on the companding azimuth quantization operation as shown in FIG. 5 by steps 512, 514, 516 and 518.

The elevation parameters are quantized as shown in FIG. 5 by step 512.

In some embodiments a companding function is determined based on the quantized elevation (and input function) and applied to the azimuth value as shown in FIG. 5 by step 514.

The companded azimuth value is then quantized (based on the determined quantization grid based on the quantized energy ratio) as shown in FIG. 5 by step 516.

The quantized companded azimuth value may then, in some embodiments, be inverse companded as shown in FIG. 5 by step 518. This operation as described above may be implemented within the decoder and thus with respect to the encoder may be optional. For example, the operation of inverse companding may be optional with respect to the encoding of direction (as the inverse companding of the direction values may be implemented within the decoder).

However, in some embodiments where quantized values of the azimuth (or direction values) are used for encoding other parameters, for example the encoding of the coherence values, then an inverse companding operation may be performed in order that the inverse companded values can be used to encode the other parameters.

In other words in some embodiments an inverse companding operation may be implemented to assist in the encoding of other parameters but is not applied to the direction (or specifically the companded azimuth values) as the inverse companding operation can be applied at the decoder.

The 'quantized' azimuth and elevation values are then output as shown in FIG. 5 by step 519.

The encoded directional values can then be output as shown in FIG. 5 by step 521.

Thus for systems with low bit allocations per subband or per group of TF tiles for the corresponding directional parameters the elevation values are checked. If they are not similar enough the directional information in the considered subband is quantized separately for each TF tile. Furthermore where the input format is determined to be multichannel the following steps may be carried out:

1. The quantized elevation is constrained to positive values only (zero included)
2. If the quantized elevation is zero
   a. Compand the azimuth with companding function F1 (for example such as shown in FIG. 6)
   b. Quantize companded value uniformly with available bits for azimuth
   c. (optionally) Inverse compand the quantized azimuth
   d. Identify the spherical index value associated with the elevation/quantized azimuth Else
   a. Compand the azimuth with companding function F2 (for example as shown in FIG. 7)
   b. Quantize companded value uniformly with available bits for azimuth
   c. (optionally) Inverse compand the quantized azimuth
   d. Identify the spherical index value associated with the elevation/quantized azimuth
3. End It can be mentioned that the verification step 2 is applied where the channel input format is different from a 5.1 or 7.1 channel input format or more generally it is not an input format which is a single plane (as these input formats always return a zero elevation.

Furthermore in some embodiments there may be a function differentiation between the input formats such as 5.1 based and 7.1 based as the preferred azimuth values for these formats differ.

The companding function may be conveniently described using linear segments enabling low complexity and reduced ROM imprint, as the same function can be used for both companding and decompanding (inverse companding). For example a companding/inverse companding operation may be implemented such as presented in the following C-code example:

```
float companding_azimuth(
   float azi,
   MC_CHANNEL_FORMAT mc_format,
   int16_t theta_flag,
   int16_t direction)
{
   int16_t no_points;
   float comp_azi;
   float pointsA[ ] = { 0.0f, 60.0f, 110.0f, 150.0f, 180.0f, 0.0f, 50.0f,
90.0f, 150.0f, 180.0f, 0.0f, 30.0f, 80.0f, 150.0f, 180.0f };
   float pointsB[ ] = { 0.0f, 90.0f, 110.0f, 170.0f, 180.0f, 0.0f, 90.0f,
110.0f, 170.0f, 180.0f , 0.0f, 10.0f, 100.0f, 170.0f, 180.0f};
   int16_t i, not_done, start;
   float abs_azi;
   float *pA, *pB;
   if ((mc_format == MC_FORMAT_CICP6) || (mc_format ==
MC_FORMAT_CICP16)) /* 5.1 or 5.1.4*/
   {
      start = 5;
   }
   else
   {
      start = 0;
   }
   if ((theta_flag == 1) && ((mc_format == MC_FORMAT_CICP16) ||
(mc_format == MC_FORMAT_CICP19))) /* 5.1.4 or 7.1.4*/
   {
      start = 10;
   }
   pA = &pointsA[start];
   pB = &pointsB[start];
   no_points = 5;
   if (direction == -1)
   {
      pA = &pointsB[start];
      pB = &pointsA[start];
```

-continued

```
   }
   else
   {
      if (direction != 1)
      {
         printf("Wrong direction in companding");
      }
   }
   not_done = 1;
   abs_azi = fabs(azi);
   comp_azi = azi;
   i = 0;
   while (not_done && (i < no_points))
   {
      if (abs_azi <= pA[i + 1])
      {
         not_done = 0;
         /* calculate companding */
         comp_azi = pB[i] + (pB[i + 1] - pB[i]) / (pA[i + 1] - pA[i]) *
         (abs_azi - pA[i]);
      }
      else
      {
         i++;
      }
   }
   if (azi < 0)
   {
      comp_azi = -comp_azi;
   }
   if (not_done == 1)
   {
      comp_azi = azi;
   }
   return comp_azi;
}
```

The proposed embodiments may improve the direction quantization resolution at low bit rates and which may be especially audible for sounds from the 'front'. In such embodiments there is no need to store the non-uniform codebook for different number of bits, just the 10 companding function values are needed.

Figure 8:
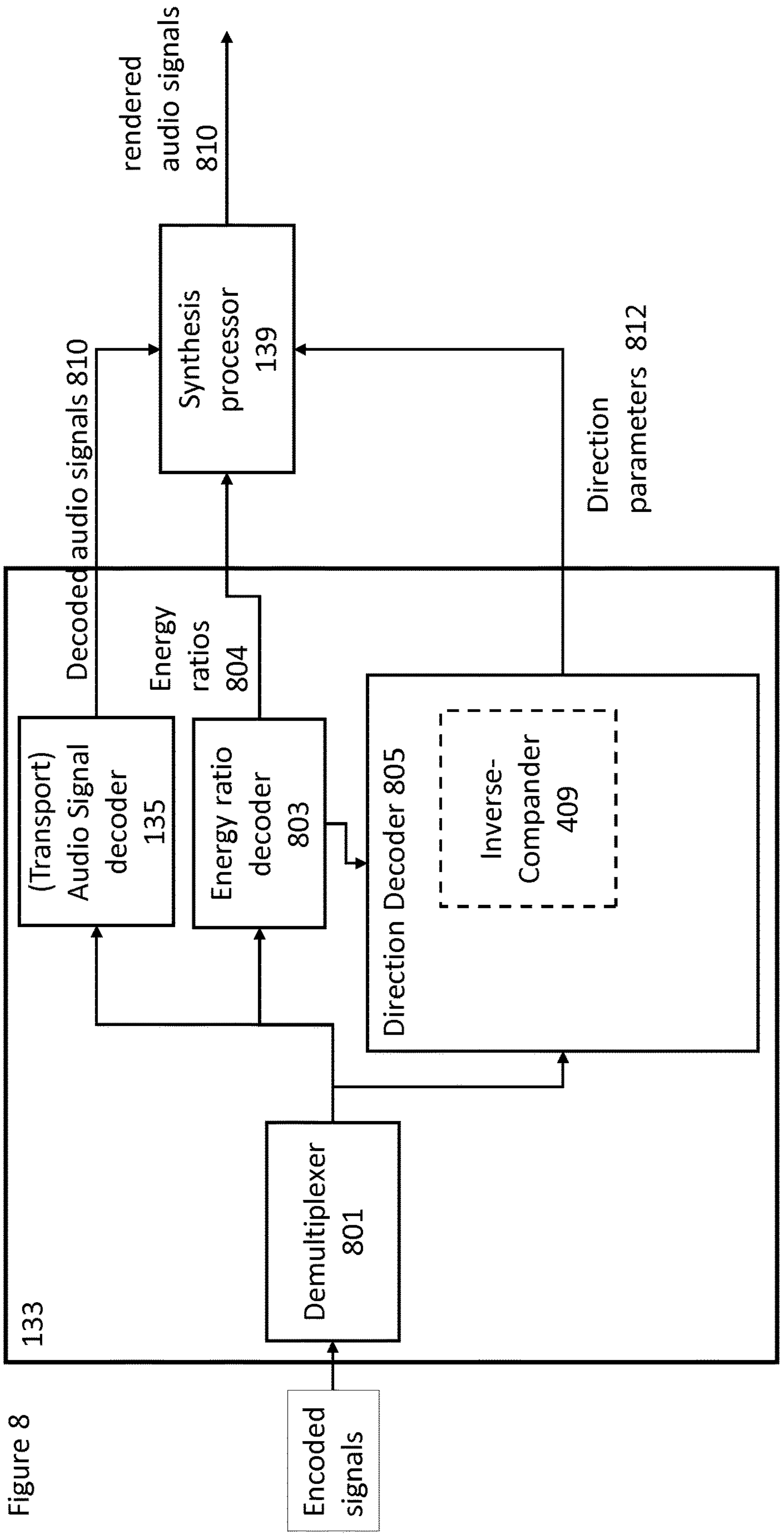
FIG. 8 shows schematically the decoder as shown in FIG. 2 according to some embodiments.

With respect to FIG. 8 the decoder 133 is shown in further detail.

The decoder 133 in some embodiments comprises a demultiplexer 801 configured to receive the encoded audio signals (the encoded transport signals) and the encoded energy ratios and encoded directional parameters (such as encoded azimuth and encoded elevation values) and demultiplex the datastream into separate encoded audio signals, encoded energy ratios and encoded directional parameters.

In some embodiments the decoder further comprises an audio signal decoder 135 configured to receive the encoded audio signals and decode these to generate decoded audio signals 810 which can be passed to the synthesis processor 139.

Furthermore in some embodiments the decoder 133 comprises an energy ratio decoder 803 configured to receive the encoded energy ratios and decode these to generate energy ratios 804 which can be passed to the synthesis processor 139.

Additionally the decoder 133 comprises a direction decoder 805. The direction decoder 805 is configured to receive the receive the average elevation value and the flexibly quantized azimuth values and regenerate the elevation and azimuth values based on the known flexible quantization methods (when the direction values are encoded based on the known average elevation/flexible azimuth quantization methods).

Furthermore the direction decoder will receive the azimuth index corresponding to the uniform quantizer, obtain the value from the uniform quantizer and then inverse compand it to obtain the real codeword. Additionally in some embodiments The direction decoder 805 may in some furthermore comprise an inverse-compander 409. The inverse-compander 409 may be configured to receive the quantized companded azimuth element of the directional parameter and also be configured to receive the quantized companded elevation value.

The inverse-compander 409 can then be configured to select an inverse-companding function based on the quantized elevation value. In some embodiments the inverse-companding function may also be determined based on the channel format which may be provided as a control or an indicator from a quantization determiner/bit distributor. The inverse-companding function can then be applied to the quantized companded azimuth element of the directional parameter to generate a quantized azimuth element.

The inverse-companding function would be the inverse of the companding function applied in the compander 405.

In some embodiments the azimuth index would be obtained separately when encoded separately from the elevation, and jointly when encoded jointly (for example when the quantization gird is a known spherical index) and then extract the azimuth index and decode it.

Figure 9:
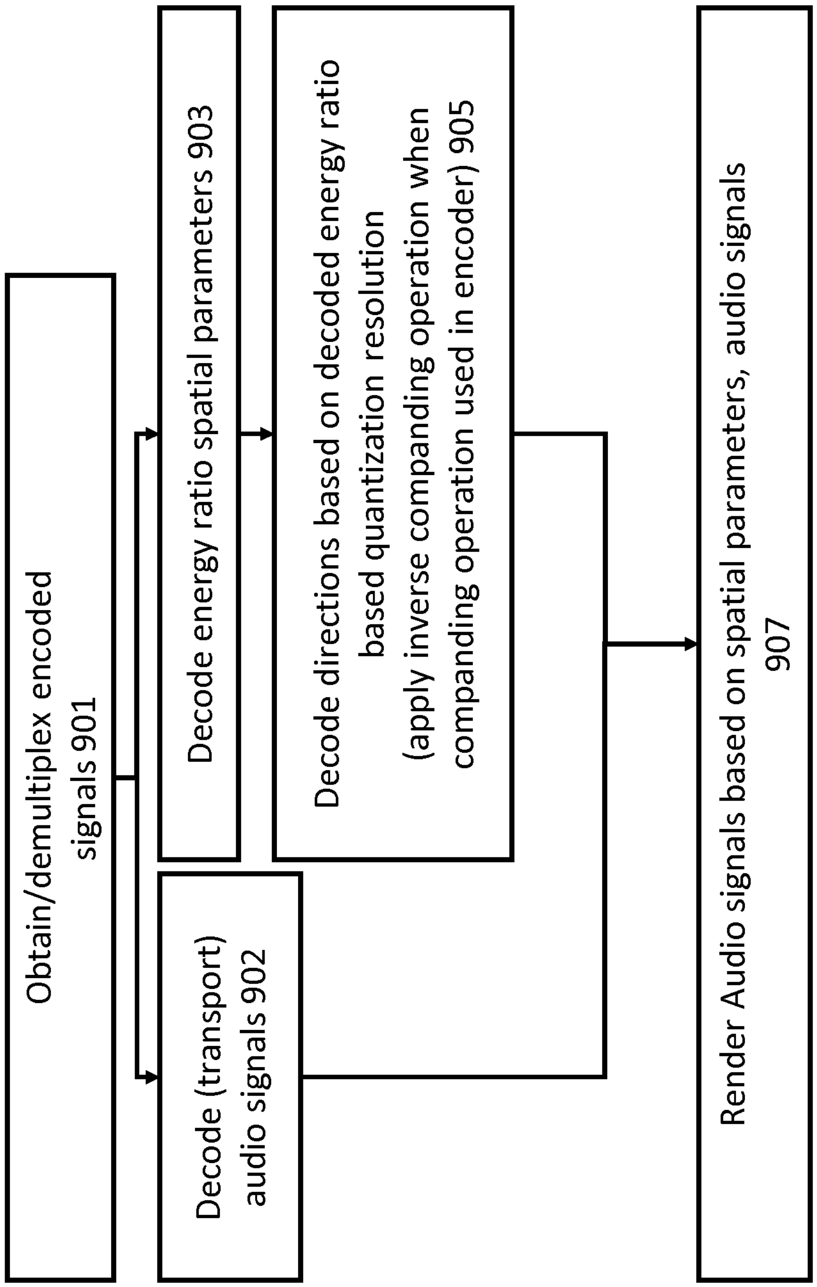
FIG. 9 shows a flow diagram of the operations of the decoder as shown in FIG. 8 according to some embodiments.

With respect to FIG. 9 is shown a flow diagram of example operations of the decoder/synthesis processor as shown in FIG. 8.

Thus the encoded signals are demultiplexed as shown in FIG. 9 by step 901.

The decoding of the audio signals is shown in FIG. 9 by step 902.

The decoding of the energy ratio spatial parameters is shown in FIG. 9 by step 903.

The decoding of the directions based on the decoded energy ratio is shown in FIG. 9 by step 905 (where an inverse companding operation is applied when the companding operation is used in the encoder).

The audio signals can then be rendered based on the spatial parameters (the directions and energy ratios) and the audio signals as shown in FIG. 9 by step 907.

In some embodiments the companding can also be used when there is a priori information about the audio source direction. Furthermore in some embodiments the companding operation or the companding function chosen to implement the companding operation may be dependent on a use case or application.

Figure 10:
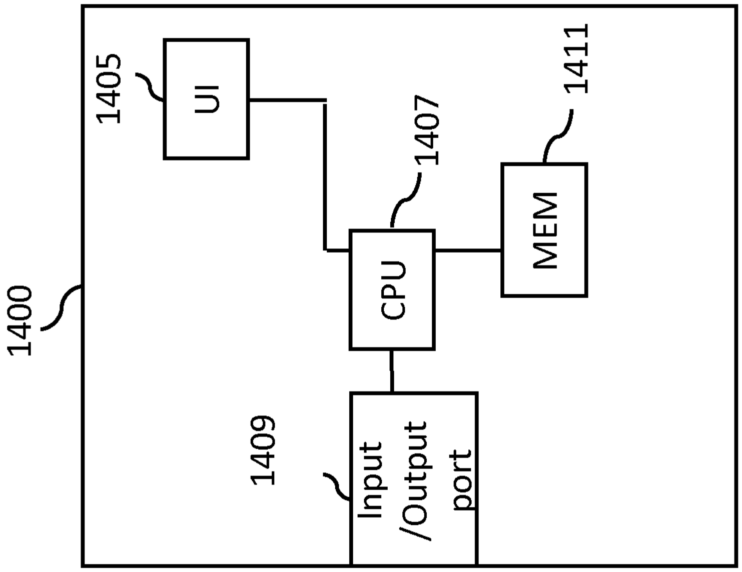
FIG. 10 shows schematically an example device suitable for implementing the apparatus shown.

With respect to FIG. 10 an example electronic device which may be used as the analysis or synthesis device is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware.

The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising at least one processor and at least one memory including computer program code, the at least one memory and the computer program code configured to with the at least one processor, cause the apparatus to:

obtain direction parameter values associated with each of at least two time-frequency tile of a multichannel audio signal, the direction parameter values associated with each time-frequency tile comprises an elevation element and an azimuth element; and compand encode each obtained direction parameter values, by the apparatus being caused to for each obtained parameter value:

quantize the elevation element;

determine a companding function based on the quantized elevation element and/or multichannel audio signal format;

generate a companded azimuth element based on the companding function applied to the azimuth element; and quantize the companded azimuth element.

2. The apparatus as claimed in claim 1, wherein the apparatus is further caused to decompand the quantized companded azimuth element based on an inverse of the companding function.

3. The apparatus as claimed in claim 2, wherein the apparatus caused to compand encode each obtained direction parameter value is further caused to generate a codeword for each quantized elevation element and decompanded quantized companded azimuth element.

4. The apparatus as claimed in claim 1, wherein the apparatus caused to determine a companding function based on the quantized elevation element and/or multichannel audio signal format is caused to determine a companding function based on the quantized elevation element and the multichannel audio signal format.

5. The apparatus as claimed in claim 4, wherein the apparatus caused to compand encode each obtained direction parameter value is further caused to determine a quantization error for the compand encode and an average elevation encode, wherein the apparatus caused to determine an average elevation encode is configured to:

quantize an average elevation element for a sub-band within a frame; and quantize the azimuth element based on a quantization grid with variable borders, and wherein the means is configured to select a compand encode output or an average elevation encode output based on the quantization error.

6. The apparatus as claimed in claim 1, wherein the apparatus caused to compand encode each obtained direction parameter value is further caused to generate a codeword for each quantized elevation element and quantized companded azimuth element.

7. The apparatus as claimed in claim 1, wherein the apparatus is further caused to determine a quantization grid based on an allocated number of bits for encoding each sub-band within a frame comprising sub-bands and time blocks based on a value of an energy ratio value associated with each obtained direction parameter value, wherein the apparatus caused to quantize the elevation element is caused to quantize the elevation element based on the quantization grid, and the apparatus caused to quantize the companded azimuth element is caused to quantize the companded azimuth based on the quantization grid.

8. An apparatus comprising at least one processor and at least one memory including computer program code, the at least one memory and the computer program code configured to with the at least one processor, cause the apparatus to:

obtain at least one encoded bitstream comprising: an encoded multichannel audio signal and compand encoded direction parameter values, the compand encoded direction parameter values are associated with at least two time-frequency tiles of the encoded multichannel audio signal, and each compand encoded direction parameter values comprises an encoded elevation element and a compand encoded azimuth element; and for each compand encoded direction parameter value:

decode the encoded elevation element;

determine a decompanding function based on the encoded elevation element and/or multichannel audio signal format; and generate a decompanded azimuth element based on the decompanding function applied to the companded encoded azimuth element.

9. The apparatus as claimed in claim 8, wherein the apparatus caused to determine a decompanding function based on the encoded elevation element and/or multichannel audio signal format is further caused to determine a decompanding function based on the encoded elevation element and the multichannel audio signal format.

10. The apparatus as claimed in claim 8, wherein the apparatus caused to decode the encoded elevation element is further caused to decode a codeword for each encoded elevation element.

11. The apparatus as claimed in claim 8, wherein the apparatus is further caused to determine a quantization grid based on an allocated number of bits for encoding each sub-band within a frame comprising sub-bands and time blocks based on a value of an energy ratio value associated with the obtained direction parameter values, wherein the apparatus caused to decode a codeword for each encoded elevation element is caused to decode the encoded elevation element based on the quantization grid.

12. A method comprising:

obtaining direction parameter values associated with each of at least two time-frequency tiles of a multichannel audio signal, the direction parameter values associated with each time-frequency tile comprises an elevation element and an azimuth element; and compand encoding each obtained direction parameter values, wherein compand encoding each obtained direction parameter values comprises:

quantizing the elevation element;

determining a companding function based on the quantized elevation element and/or multichannel audio signal format;

generating a companded azimuth element based on the companding function applied to the azimuth element; and quantizing the companded azimuth element.

13. The method as claimed in claim 12, further comprising decompanding the quantized companded azimuth element based on an inverse of the companding function.

14. The method as claimed in claim 13, wherein compand encoding each obtained direction parameter value further comprises generating a codeword for each quantized elevation element and decompanded quantized companded azimuth element.

15. The method as claimed in claim 12, wherein determining a companding function based on the quantized elevation element and/or multichannel audio signal format further comprises determining a companding function based on the quantized elevation element and the multichannel audio signal format.

16. The method as claimed in claim 12, wherein compand encoding each obtained direction parameter value further comprises generating a codeword for each quantized elevation element and quantized companded azimuth element.

17. A method comprising:

obtaining at least one encoded bitstream comprising: an encoded multichannel audio signal and compand encoded direction parameter values, the compand encoded direction parameter values are associated with at least two time-frequency tiles of the encoded multichannel audio signal, and each compand encoded direction parameter value comprises an encoded elevation element and a companded encoded azimuth element; and for each compand encoded direction parameter value the method comprises:

decoding the encoded elevation element;

determining a decompanding function based on the encoded elevation element and/or encoded multichannel audio signal format; and generating a decompanded azimuth element based on the decompanding function applied to the companded encoded azimuth element.

18. The method as claimed in claim 17, wherein the determining a decompanding function based on the encoded elevation element further and/or encoded multichannel audio signal format comprises determining a decompanding function based on the encoded elevation element and the encoded multichannel audio signal format.

19. The method as claimed in claim 17, wherein decoding the encoded elevation element further comprises decoding a codeword for each encoded elevation element.

20. The method as claimed in claim 19, further comprising determining a quantization grid based on an allocated number of bits for encoding each sub-band within a frame comprising sub-bands and time blocks based on a value of an energy ratio value associated with the obtained direction parameter values, wherein decoding a codeword for each encoded elevation element comprises decoding the encoded elevation element based on the quantization grid.

* * * * *